United States Patent [19]
Kruse et al.

[11] Patent Number: 5,590,269
[45] Date of Patent: Dec. 31, 1996

[54] RESOURCE ASSIGNMENT SYSTEM PROVIDING MIXED-INITIATIVE USER INTERFACE UPDATES

[75] Inventors: John M. Kruse, Minneapolis, Minn.; John E. Collins, Hudson, Wis.; Elizabeth M. Sisley, Woodbury, Minn.

[73] Assignee: Minnesota Mining & Manufacturing Company, St. Paul, Minn.

[21] Appl. No.: 231,031

[22] Filed: Apr. 22, 1994

[51] Int. Cl.⁶ .............................. G06F 15/00; G06F 7/00
[52] U.S. Cl. .......................... 395/209; 395/601; 395/326; 364/925; 364/926
[58] Field of Search ................................... 395/155–161, 395/600; 364/401, 403, 925, 928

[56] References Cited

U.S. PATENT DOCUMENTS

| | | | |
|---|---|---|---|
| 4,443,863 | 4/1984 | Bunch et al. | 364/900 |
| 4,937,743 | 6/1990 | Rassman et al. | 364/401 |
| 5,099,431 | 3/1992 | Natarajan | 364/468 |
| 5,133,075 | 7/1992 | Risch | 395/800 |
| 5,241,465 | 8/1993 | Oba et al. | 364/401 |
| 5,325,292 | 6/1994 | Crockett | 364/401 |
| 5,420,968 | 5/1995 | Johri | 395/133 |
| 5,442,735 | 8/1995 | Paradine | 395/133 |
| 5,446,838 | 8/1995 | Kimelman | 395/161 |
| 5,467,268 | 11/1995 | Sisley et al. | 364/401 |

FOREIGN PATENT DOCUMENTS

| | | | |
|---|---|---|---|
| 0306965 | 3/1989 | European Pat. Off. | G06F 15/60 |

OTHER PUBLICATIONS

A. V. Hill and D. C. Whybark, "Chexpedite: A Computer–Based Approach to the Bank Courier Problem", *Decision Sciences*, vol. 13, No. 2, Apr. 1982, pp. 251–265.

M. S. Fox and S. F. Smith, "ISIS—a knowledge–based system for factory scheduling", *Expert Systems*, vol. 1, No. 1, 1984, pp. 25–49.

A. V. Hill and D. C. Whybark, "Comparing Exact Solution Procedures for the Multi–Vehicle Routing Problem", *The Logistics and Transportation Review*, vol. 12, No. 3, 1976, pp. 145–153.

T. Dean and M. Boddy, "An Analysis of Time–Dependent Planning", in Proceedings of the Seventh National Conference on Artificial Intelligence, A.A.A.I., 1988, pp. 49–54.

H. Berliner and G. Goetsch, "A Study of Search Methods: The Effect of Constraint Satisfaction and Adventurousness", in Proceedings of the Ninth International Joint Conference on Artificial Intelligence, vol. 2, Aug. 18–23, 1985, pp. 1079–1082.

A. V. Hill, J. D. Naumann, and N. L. Chervany, "SCAT and SPAT: Large–Scale Computer–Based Optimization Systems for the Personnel Assignment Problem", *Decison Sciences*, vol. 14, No. 2, Apr. 1983, pp. 207–220.

B. Kalantari, A. V. Hill, and S. R. Arora, "An algorithm for the traveling salesman problem with pickup and delivery customers", *European Journal of Operational Research*, vol. 22, No. 3, Dec. 1985, pp. 377–386.

(List continued on next page.)

*Primary Examiner*—Mark R. Powell
*Assistant Examiner*—A. Katbab
*Attorney, Agent, or Firm*—Carolyn A. Bates; Steven J. Shumaker

[57] ABSTRACT

A resource assignment system provides mixed-initiative updates of a user interface display in response to asynchronous events independently triggering updates. The system features an update module capable of selecting one of a plurality of diverse update modes based on system user input and additional criteria relating to each update. The update modes enable the system user to develop an update behavior appropriate for her individual circumstances. Selection of an update behavior can prevent disruption of the system user's work, producing an appearance of interface stability without sacrificing near real-time response to asynchronous events.

31 Claims, 10 Drawing Sheets

OTHER PUBLICATIONS

A. V. Hill, "An Experimental Comparison of Dispatching Rules for Field Service Support", *Decision Sciences*, vol. 23, No. 1, Winter 1992, pp. 235–249.

D. Whitley, T. Starkweather, and D. Shaner, "The Traveling Salesman and Sequence Scheduling: Quality Solutions Using Genetic Edge Recombination", *Handbook of Genetic Algorithms*, Chapter 22, 1991, pp. 350–372.

M. Zweben, M. Deale, and R. Gargan, "Anytime Rescheduling", in Proceedings of a Workshop on Innovative Approaches to Planning, Scheduling and Control, San Diego, California, Nov. 5–8, 1990, pp. 251–259.

A. V. Hill, V. A. Mabert, and D. W. Montgomery, "A Decision Support System for the Courier Vehicle Scheduling Problem", *OMEGA Int. J. of Mgmt. Sci.*, vol. 16, No. 4, 1988, pp. 333–345.

H. Prade, "Using Fuzzy Set Theory in a Scheduling Problem: A Case Study", *Fuzzy Sets and Systems*, vol. 2, No. 2, 1979, pp. 153–165.

M. S. Fox, N. Sadeh, and C. Baykan, "Constrained Heuristic Search", in Proceedings of the Eleventh International Joint Conference on Artificial Intelligence (IJCAI), Detroit, Michigan, vol. 1, Aug. 20–25, 1989, pp. 309–315.

W. Chiang and M. S. Fox, "Protection Against Uncertainty in a Deterministic Schedule", in Proceedings of the Fourth International Conference on Expert Systems in Production and Operations Management, Hilton Head, South Carolina, May 1990, pp. 184–196.

M. Zweben, "Constraint–Based Simulated Annealing: An Iterative Improvement Framework for Constraint Satisfaction Search", NASA Ames Research Center, Moffett Field, California, Aug. 9, 1990, pp. 1–13.

R. Hublou, "Manufacturing Operations Scheduling", *Business Intelligence Program Report D90–1436*, SRI International, May 1990, pp. 1–39.

A. V. Hill, "An Experimental Comparison of Human Schedulers and Heuristic Algorithms for the Traveling Salesman Problem", *Journal of Operations Management*, vol. 2, No. 4, Aug. 1982, pp. 215–223.

P. Prosser, "A Reactive Scheduling Agent", in Proceedings of the Eleventh International Joint Conference on Artificial Intelligence, Detroit, Michigan, August 20–25, 1989, pp. 1004–1009.

E. Ghalichi and J. Collins, "The Dispatch Advisor", in Proceedings of the Workshop on Artificial Intelligence for Customer Service and Support, Eighth IEEE Conference on Artificial Intelligence Applications, Monterey, California, Mar. 3, 1992, pp. 60–68.

J. E. Collins and E. M. Sisley, "AI in Field Service: The Dispatch Advisor", in Working Notes, AI in Service and Support: Bridging the Gap Between Research and Applications, Eleventh National Conference on Artificial Intelligence, Washington, D.C., July 11–15, 1993, pp. 26–37.

J. Tsitsiklis, "Special Cases of Traveling Salesman and Repairman Problems with Time Windows", Report LIDS–P–1987, Massachusetts Institute of Technology, Jun. 1990, pp. 1–23.

S. F. Smith, "The OPIS Framework for Modeling Manufacturing Systems", Tech Report CMU–RI–TR–89–30, Carnegie–Mellon University, Dec. 1989, pp. 1–56.

D. L. Haugen, "A Study of Scheduling and Quality of Field–Service Support Systems", Ph.D. Thesis, University of Minnesota, Nov. 1993, pp. 1–251.

IBM Technical Disclosure Bulletin, vol. 35, No. 7, Dec. 1992, pp. 256–259.

Kazuo Sugihara, Tohru Kikuno and Noriyoshi Yoshida, "A Meeting Scheduler for Office Automation", *IEEE Transactions on Software Engineering*, vol. 15, No. 10, Oct. 1989, pp. 1141–1146.

RESOURCE ASSIGNMENT SYSTEM PROVIDING MIXED-INITIATIVE USER INTERFACE UPDATES

CROSS-REFERENCE TO RELATED APPLICATIONS

The present application is related to U.S. patent application Ser. No. 08/201,664, issued on U.S. Pat. No. 5,467,268, of Elizabeth M. Sisley and John E. Collins, filed Feb. 25, 1994, and entitled "SYSTEM AND METHOD FOR RESOURCE ASSIGNMENT AND SCHEDULING," now U.S. Pat. No. 5,467,268 U.S. patent application Ser. No. 08/210,678, of John E. Collins and Elizabeth M. Sisley, filed Mar. 18, 1994, and entitled "SYSTEM AND METHOD FOR SCHEDULING RESOURCE REQUESTS," and U.S. patent application Ser. No. 08/220,831, of John E. Collins and Elizabeth M. Sisley, filed Mar. 31, 1994, and entitled "SYSTEM INTEGRATING ACTIVE AND SIMULATED DECISIONMAKING PROCESSES." The content of each of the above-referenced copending United States patent applications is incorporated herein by reference.

FIELD OF THE INVENTION

The present invention relates to techniques for managing a user interface, and, more particularly, to techniques for updating a user interface display in a mixed-initiative system.

DISCUSSION OF RELATED ART

A mixed-initiative system initiates action in response to independent input from one of a plurality of asynchronous input streams. An example of a mixed-initiative system is disclosed in copending U.S. patent application Ser. No. 08/201,664, now U.S. Pat. No. 5,467,268, directed to a software system that generates resource assignment and scheduling recommendations. One or more user interfaces and a database interface generate asynchronous events that independently trigger the generation of assignment and scheduling recommendations by the system. A system user may accept a recommendation from the system or enter an alternative assignment and scheduling decision via one of the user interfaces. Each user interface displays a graphical representation of various resource assignments to aid system users in making assignment and scheduling decisions. During the decisionmaking process, recommendations issued by the system and decisions made by system users undergo continuous change. Because obsolete data may adversely affect the decisions made by a system user, it is important to update the user interface display to keep the system user informed of the current situation.

The update of the user interface display is complicated, however, by the mixed-initiative behavior of the system. Specifically, events received from the database interface or other user interfaces may independently initiate assignment and scheduling recommendations that require updates of the user interface display used by a particular system user. A display update generated in response to such recommendations may overlap or conflict with work being conducted by the particular system user. Thus, the initiative of the assignment and scheduling system may conflict with the initiative of the system user, causing disruption of the system user's work. This potential conflict makes it difficult to update the user interface display in a coherent manner while maintaining near real-time response to the asynchronous events. As an illustration, the system may respond to an event received from the database interface by generating a recommendation that results in the reassignment of several resource requests visible on the system user's display. If the system user is in the process of examining potential assignments for one of the reassigned resource requests, an immediate display update may move the resource request to a different area of the display, or entirely off of the visible portion of the display. This type of disruption results in an appearance of instability that can be disconcerting to the system user. The instability significantly decreases the system user's perceptions of predictability and control over the user interface, causing user dissatisfaction.

SUMMARY OF THE INVENTION

In view of the interface instability problems existent in a mixed-initiative system, the present invention is directed to a resource assignment system for providing mixed-initiative user interface updates that is capable of producing an appearance of stability to the system user without sacrificing near real-time response to asynchronous events.

Additional features and advantages of the invention will be set forth in part in the description that follows, and in part will be apparent from the description, or may be learned by practice of the invention. The advantages of the invention will be realized and attained by the system particularly pointed out in the written description and claims hereof, as well as in the appended drawings.

To achieve the foregoing advantages, as broadly embodied and described herein, the present invention provides a computer-implemented system for assigning a plurality of resource requests among a plurality of resource providers, the system comprising an assignment database for storing an assignment set, the assignment set defining assignment of one or more of the resource requests among the resource providers, a user interface for displaying a representation of at least part of the assignment set, and for receiving input from a system user, and an update module for receiving changes to the assignment set, and for updating the user interface to display a representation of each of the changes to the assignment set, the update module including means for selecting one of a plurality of update modes, the plurality of update modes including an assertive mode wherein the update module updates the user interface in response to receipt of each of the changes to the assignment set, and an update-on-request mode wherein the update module updates the user interface in response to a combination of the receipt of each of the changes to the assignment set and an update request input received by the user interface from the system user.

In another aspect, the present invention provides a computer-implemented system for assigning a plurality of resource requests among a plurality of resource providers, the system comprising an assignment database for storing an assignment set, the assignment set defining assignment of one or more of the resource requests among the resource providers, a user interface for displaying a representation of at least part of the assignment set, and for receiving input from a system user, and an update module for receiving changes to the assignment set, and for updating the user interface to display a representation of each of the changes to the assignment set, the update module including means for selecting one of a plurality of update modes, the plurality of update modes including an assertive mode wherein the update module updates the user interface in response to receipt of each of the changes to the assignment set, and an update-on-delay mode wherein the update module updates the user interface in response to a combination of the receipt of each of the changes and an elapse of a time delay from a time of the receipt of each of the changes.

It is to be understood that both the foregoing general description and the following detailed description are exemplary and explanatory only, and not restrictive of the invention, as claimed.

The accompanying drawings are included to provide a further understanding of the invention and are incorporated in and constitute a part of this specification. The drawings illustrate exemplary embodiments of the invention and together with the description serve to explain the principles of the invention.

DETAILED DESCRIPTION OF THE PREFERRED EMBODIMENT

Reference will now be made in detail to an exemplary embodiment of the invention. One skilled in the art, given the description herein, will recognize the utility of the system of the present invention in a variety of diverse resource environments in which assignment and scheduling problems exist. For example, it is conceivable that the system of the present invention may be adapted for assignment and scheduling problems existent in organizations engaged in diverse activities such as telecommunications, power generation, traffic management, medical resource management, transportation dispatching, emergency services dispatching, inventory management, and logistics. However, for ease of description, as well as for purposes of illustration, the present invention primarily will be described in the context of a field service environment.

Figure 1:
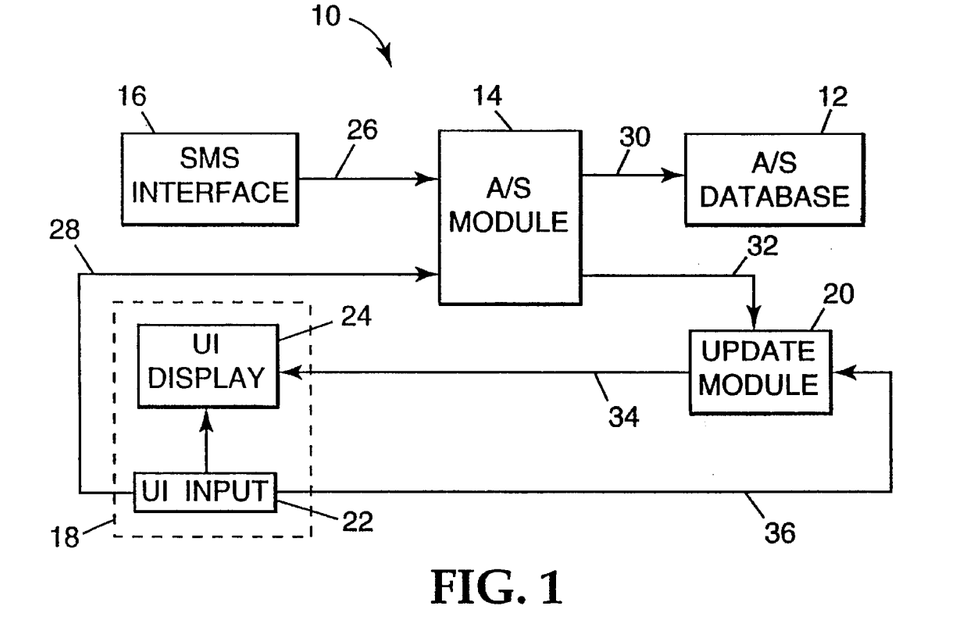
FIG. 1 is a block diagram illustrating a resource assignment system providing mixed-initiative updates of a user interface display, in accordance with the present invention.

FIG. 1 is a block diagram of an exemplary embodiment of a resource assignment system for providing mixed-initiative updates of a user interface display, in accordance with the present invention. The system 10 of FIG. 1 is a computer-implemented software system realized, for example, by a software process running on a standard Unix™ workstation. The software process of system 10 may be implemented with the Common Lisp Object System (CLOS). As illustrated in FIG. 1, system 10 comprises an assignment and scheduling (A/S) database 12, an assignment and scheduling (A/S) module 14, a service management system (SMS) database interface 16, at least one user interface 18, and an update module 20. The user interface 18 includes an input device 22 and a display device 24. Although SMS database interface 16 and user interface 18 are described herein as discrete components, they may be integrated to combine SMS functionality with the assignment and scheduling activity of system 10.

The A/S database 12 stores a set of resource requests, a set of resource providers, and an assignment set defining assignments of one or more of the resource requests among the resource providers. The assignment set includes a schedule set further defining schedules of the resource requests assigned to each resource provider. For a field service environment, the corresponding representational sets are a call set defined by a plurality of customer service calls requiring maintenance or repair services, a technician set defined by a plurality of field service technicians operating in the field service environment, an assignment set defining assignments of calls to technicians, and a schedule set defining schedules of the calls assigned to each technician. The system user in the field service context may be, for example, a field service call dispatcher. Although A/S database 12 is described herein as a discrete component, it may form part of an SMS database accessed by SMS database interface 16.

The A/S module 14 generates assignment and scheduling recommendations in response to events. The recommendations generated by A/S module 14 represent changes to the assignment set stored in A/S database 12. The events that initiate the assignment and scheduling activity of A/S module 14 represent changes to the set of resource requests stored in A/S database 12, changes to the set of resource providers also stored in A/S database 12, or requests for further evaluation of outstanding recommendations. In the field service context, for example, A/S module 14 responds to call-events representing changes to the call set, tech-events representing changes to the technician set, or reevaluation-events representing requests for further evaluation. A change to the call set may constitute the addition of a new call, the cancellation of a pending call, or a change in attributes associated with a particular call. A change to the technician set similarly may constitute a change in attributes associated with a particular technician.

In operation, A/S module 14 initiates a constrained search for potential assignment and scheduling solutions in response to a call-event, tech-event, or reevaluation-event, and returns the best solution found as a recommendation.

The A/S module 14 activates two software process modules that cooperate to reach the assignment/scheduling recommendation. Specifically, A/S module 14 comprises an assigner module, responsible for assigning new and pending service calls among the technicians, and a scheduler module, invoked by the assigner module to generate a schedule of the calls assigned to each individual technician. Thus, each assignment in the assignment set involves both an association of a call with a technician, as determined by the assigner module, and a scheduling of the call at a particular time, as determined by the scheduler module. The A/S module 14 combines optimization, artificial intelligence, and constraint-processing techniques to arrive at near-optimal recommendations. The structure and operation of A/S module 14 are described in detail in the aforementioned copending U.S. patent application Ser. No. 08/201,664.

The assignment and scheduling activity of A/S module 14 is asynchronously initiated by either events received from SMS database interface 16 or events received from user interface 18. The SMS database interface 16 receives SMS event data from a service management system (SMS) database (not shown). The SMS event data is generated with an SMS software application designed to track service calls received from field service customers. Examples of commercially available SMS software systems are the S2000™ system manufactured by Service Systems International, and the OPEN UPTIME™ system manufactured by Metrix. When a customer requests repair services, a call taker working for the service organization uses the SMS software application to enter new calls and accompanying call attributes provided by the customer into the SMS database. The call taker deletes a call from the SMS database when the customer reports a cancellation, and alters the attributes of a call when notified by the customer. The SMS application may also add a call to the SMS database in response to call information received directly from a customer, or repair signals transmitted from a malfunctioning machine. Thus, the SMS event data captured by the SMS interface 16 constitute call-events representing incremental changes to the call set. If the SMS database and A/S database 12 are integrated, the SMS event data may also include tech-events representing changes to the technician set. The SMS interface 16 translates the SMS event data into call-events and tech-events, and passes the events to A/S module 14, as indicated by line 26, thereby initiating assignment and scheduling activity.

The user interface 18 receives field event data entered by a system user via input device 22. The input device 22 may comprise a conventional input device such as, for example, a mouse and a keyboard. The field event data received by user interface 18 includes both tech-events and call-events, representing changes to the technician and call sets, respectively, as well as reevaluation-events representing requests for further evaluation of an outstanding recommendation for a particular call or technician. The call-events and tech-events generally result from notification by technicians or other field personnel, and may include a change in call attributes or a change in technician attributes. In addition, the system user may override recommendations issued by A/S module 14 by entering changes to the assignment set via input device 22. The changes to the assignment set represent user-selected assignments of particular calls to particular technicians. Like the SMS interface 16, the user interface 18 translates the field event data into events, and passes the events to A/S module 14, as indicated by line 28, to initiate assignment and scheduling activity.

An input queue (not shown) associated with A/S module 14 may linearize the asynchronous events received from SMS interface 16 and user interface 18. The A/S module 14 searches for updated assignment and scheduling solutions in response to each event, and returns the best solution found as a recommendation. The A/S module 14 then updates the contents of A/S database 12, as indicated by line 30, to incorporate the resulting change to the assignment set and the changes to either the call set or technician set, as represented by the particular event. The A/S module 14 also passes the change to the assignment set to update module 20, as indicated by line 32. Although it is described herein as a discrete software process module communicating with A/S module 14, update module 20 conceivably can be implemented as an integral component of A/S module 14. The update module 20 notifies the system user of the change by updating user interface 18 to display a graphical representation of the change via display device 24, as indicated by line 34. The user interface 18 responds by modifying the graphical representation of the assignment set to include the change.

Figure 2:
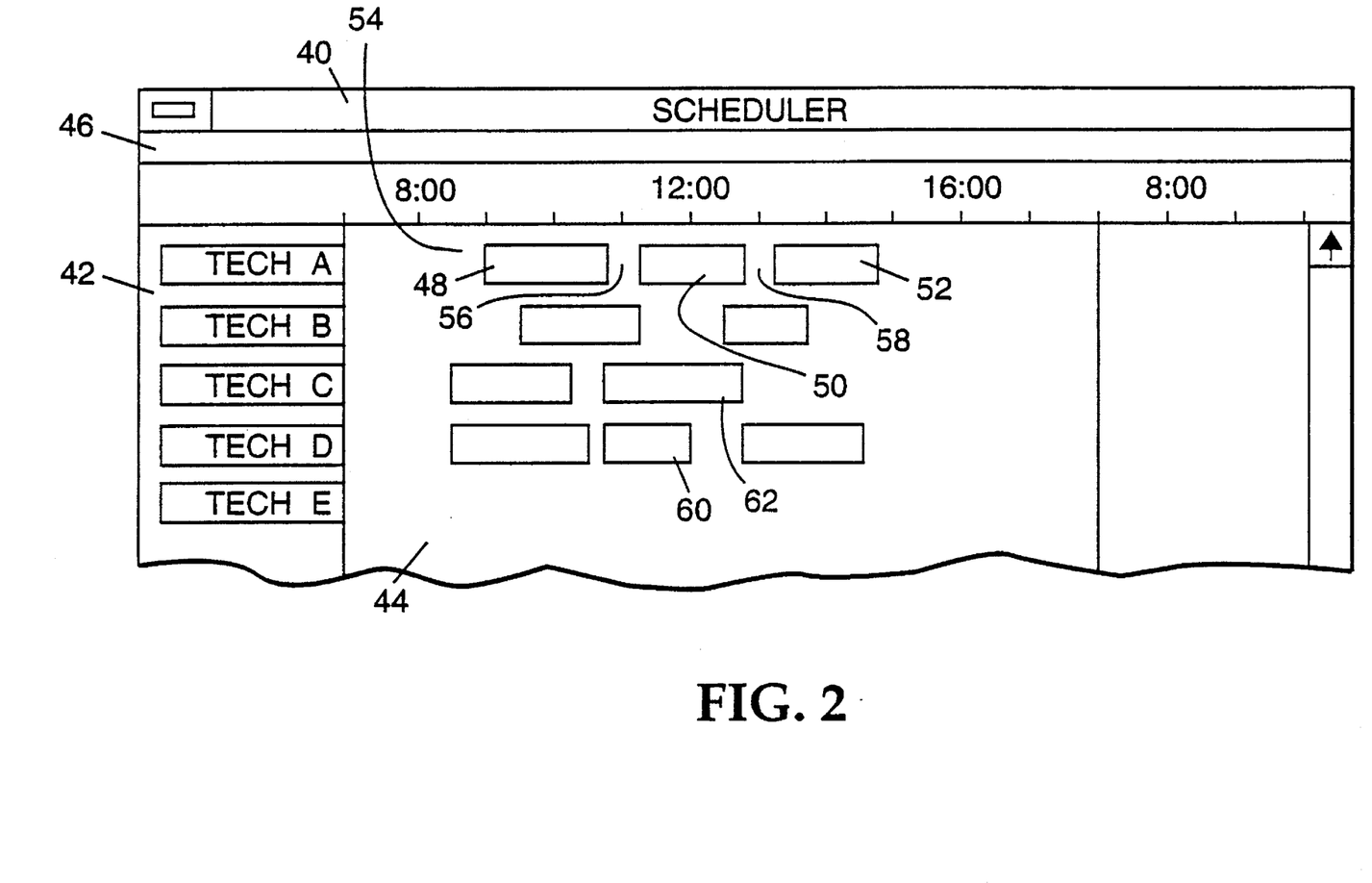
FIG. 2 is an example of a user interface displaying a graphical representation of an assignment set, in accordance with the present invention.

FIG. 2 is an example of a graphical representation of a portion of the assignment set, as displayed by user interface 18 via display device 24. The graphical representation displayed on display device 24 more specifically conveys a representation of the schedules for a subset of technicians selected by the system user. Thus, the display device 24 provides the system user with information concerning the assignment of particular calls to technicians, and the times at which the assigned calls are scheduled. The graphical representation displayed on display device 24 by user interface 18 may be implemented, for example, using X-Windows. The display device 24 may be realized by a common CRT or flat-panel display. In the example of FIG. 2, the graphical representation displayed on display device 24 includes an interactive scheduler window 40. The scheduler window 40 includes a technician field 42 containing a representation of the selected technicians under evaluation by the system user, a schedule field 44 containing a representation of the calls assigned to each of the technicians and the particular times for which the calls are scheduled, and a command bar 46 containing representations of standard window control commands. The technician field 42 displays a group of technicians A, B, C, D, and E operating in the field service environment. The schedule field 44 in FIG. 2 indicates that technician A has been assigned first, second, and third scheduled calls represented by call blocks 48, 50, and 52. The schedule field 44 also includes time blocks 54, 56, 58 representing travel times between successive calls.

The schedule field 44 represents the existing schedules of the technicians, according to recommendations generated by the A/S module 14, subject to approval or modification by the system user. If the system user rejects a recommendation issued by the A/S module 14, she can enter an alternative assignment, via input device 22, representing a change to the assignment set, The user interface 18 passes the change to A/S module 14 as an assignment-event, as indicated by line 28. As with other events, A/S module 14 updates A/S database 12 to include the change represented by the assignment-event, as indicated by line 30, and passes the change to update module 20, as indicated by line 32. The update module 20 responds to changes to the assignment set by updating user interface 18 to incorporate a graphical representation of the respective change. The A/S module 14 may generate recommendations that conflict with work currently being conducted by a particular system user, but which nevertheless require an update of user interface 18. This potential conflict illustrates the mixed-initiative behavior of system 10. If resource assignment system 10 accommodates multiple system users, asynchronous events may be received from several user interfaces, compounding the potential conflicts.

To alleviate instability problems in user interface 18, in accordance with the present invention, update module 20 selects one of a plurality of update modes for updating user interface 18. The particular update mode selected by update module 20 determines the protocol followed by the system user and A/S module 14 in directing changes to the graphical representation displayed by user interface 18. The various update modes of update module 20 range from very polite, involving intervention only at the user's request, to very assertive, involving immediate intervention. This range of choices enables the system user to select a system behavior that produces a degree of interface stability appropriate for the user's particular circumstances. The update module 20 thereby enhances the system user's productivity by increasing perceptions of predictability and control over user interface 18, but does not affect the ability of A/S module 14 to process events with near real-time response.

Examples of the various update modes of update module 20 include: (1) an assertive mode in which update module 20 updates user interface 18 immediate response to receipt of a change to the assignment set from A/S module 14, (2) an update-on-request mode in which update module 14 updates user interface 18 in response to the combination of receipt of a change to the assignment set from A/S module 14 and an update request input received by user interface 18 from the system user via input device 22, (3) an update-on-delay mode in which update module 20 updates user interface 18 in response to the combination of receipt of a change to the assignment set from A/S module 14 and the elapse of a time delay from the time the change is received, and (4) various hybrid modes combining aspects of the assertive mode, update-on-request-mode, and update-on-delay mode, as determined by the system user.

In the assertive mode, update module 20 immediately updates user interface 18 as a change to the assignment set is received from A/S module 14, without regard to whether the change conflicts with work being conducted by the system user. The immediate intervention of update module 20 in the assertive mode may cause occasional disruption of the system user's work due to the mixed-initiative behavior of system 10. However, other considerations may outweigh this drawback. In particular, the system user may find the assertive mode necessary for situations in which the cost of working with even slightly obsolete information is unacceptable. In this case, the assertive mode provides immediate updates of user interface 18 to ensure that the system user always views the most current information.

Figure 3:
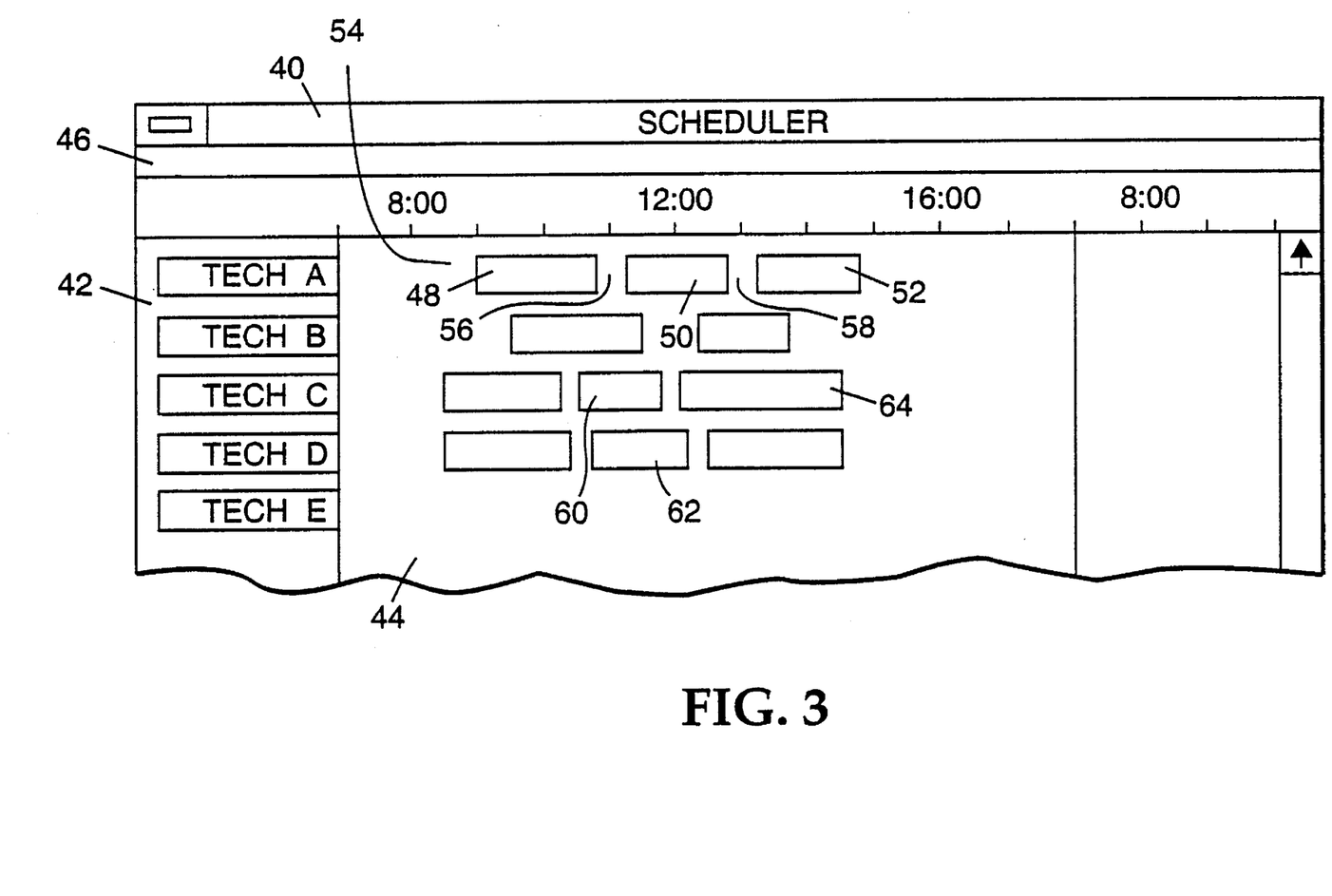
FIG. 3 is an example of a user interface displaying a graphical representation of an assignment set in an assertive update mode, in accordance with the present invention.

FIG. 3 is an example of a graphical representation displayed by user interface 18 via display device 24 when the assertive mode of update module 20 is selected. The graphical representation shown in FIG. 3 substantially corresponds to that shown in FIG. 2. With reference to both FIG. 2 and FIG. 3, however, it is assumed that update module 20 receives a change to the assignment set that involves the reassignment of a first call, represented by call block 60, from technician D to technician C, the reassignment of a second call, represented by call block 62, from technician C to technician D, and the assignment of a new call, represented by call block 64, to technician C. In response to the change, update module 20 updates user interface 18 without consulting the system user. As shown in FIG. 3, the update results in the movement of call blocks 60, 62 between the schedules for technicians C and D, and the addition of call block 64 to the schedule for technician C.

In the update-on-request mode, update module 20 does not update user interface 18 until the system user explicitly requests an update via input device 22. However, update module 20 may control user interface 18 to display a non-modal update message on display device 24 notifying the system user that an update is pending. The update message indicates that the information presently viewed by the system user has changed, but allows the system user to finish work in progress without disruption. The update message preferably provides a conspicuous, visible alert, and may be accompanied by an audible icon to enhance the awareness of the system user. The visible portion of the update message may take any of a variety of forms suitable for indicating a pending update. In addition, the visible portion of the update message may convey detailed information concerning the content of the pending update.

Figure 4:
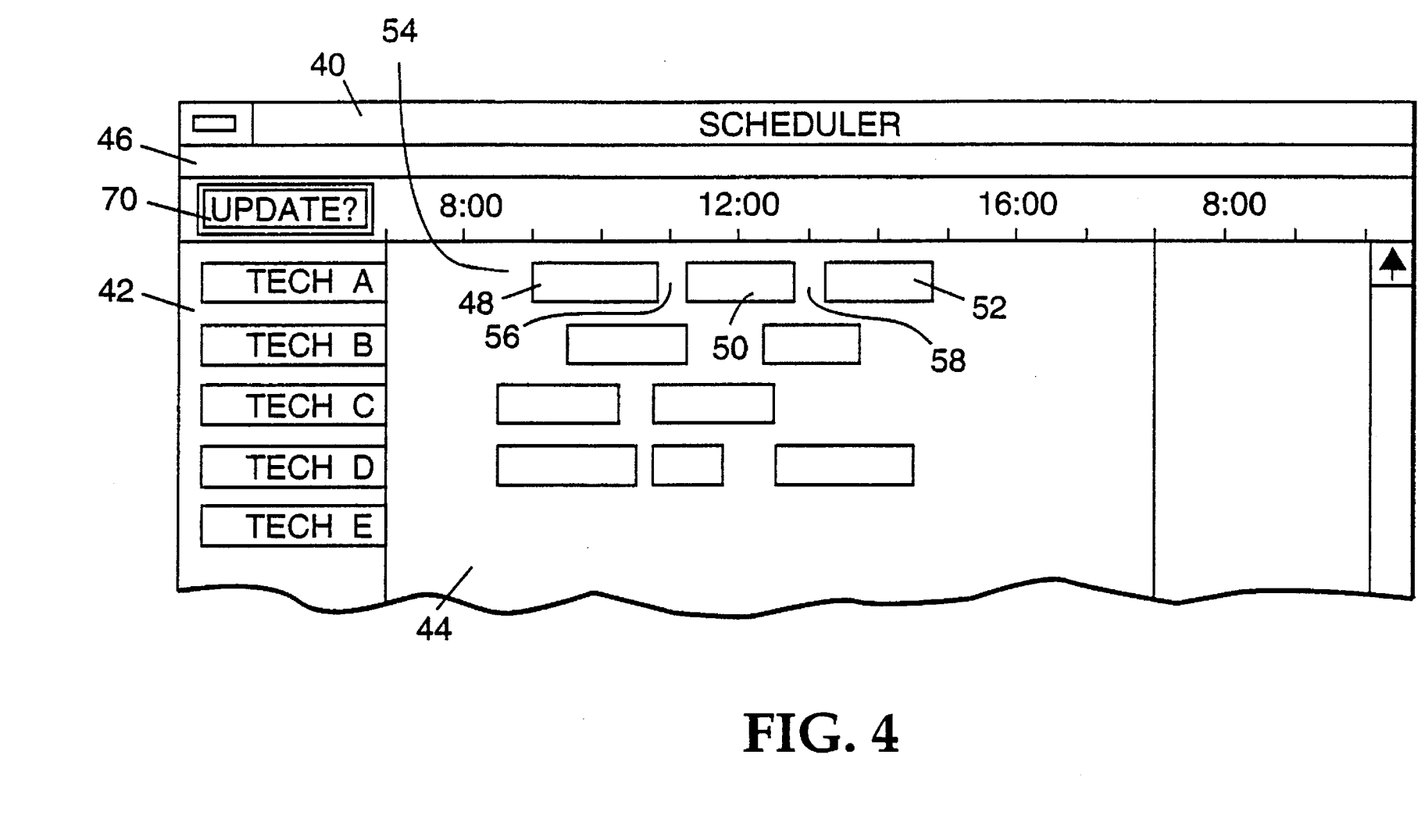
FIG. 4 is a first example of a user interface displaying a graphical representation of an assignment set in an update-on-request mode, in accordance with the present invention.

FIG. 4 is a first example of a graphical representation displayed by user interface 18 when the update-on-request mode of update module 20 is selected. The graphical representation shown in FIG. 4 substantially corresponds to that shown in FIG. 2. In response to a change in the assignment set, however, update module 20 directs user interface 18 to post an update message in the form of button 70. The non-modal button 70 allows the system user to finish any work in progress, but provides a continuous reminder that an update is pending. The system user can then enter an update request by clicking on button 70. The update module 20 receives the update request, as indicated by line 36 of FIG. 1, and then controls user interface 18 to add the content of the update to the display. Until the system user clicks on button 70 with the mouse, the state of schedule field 44 is left undisturbed.

Figure 5:
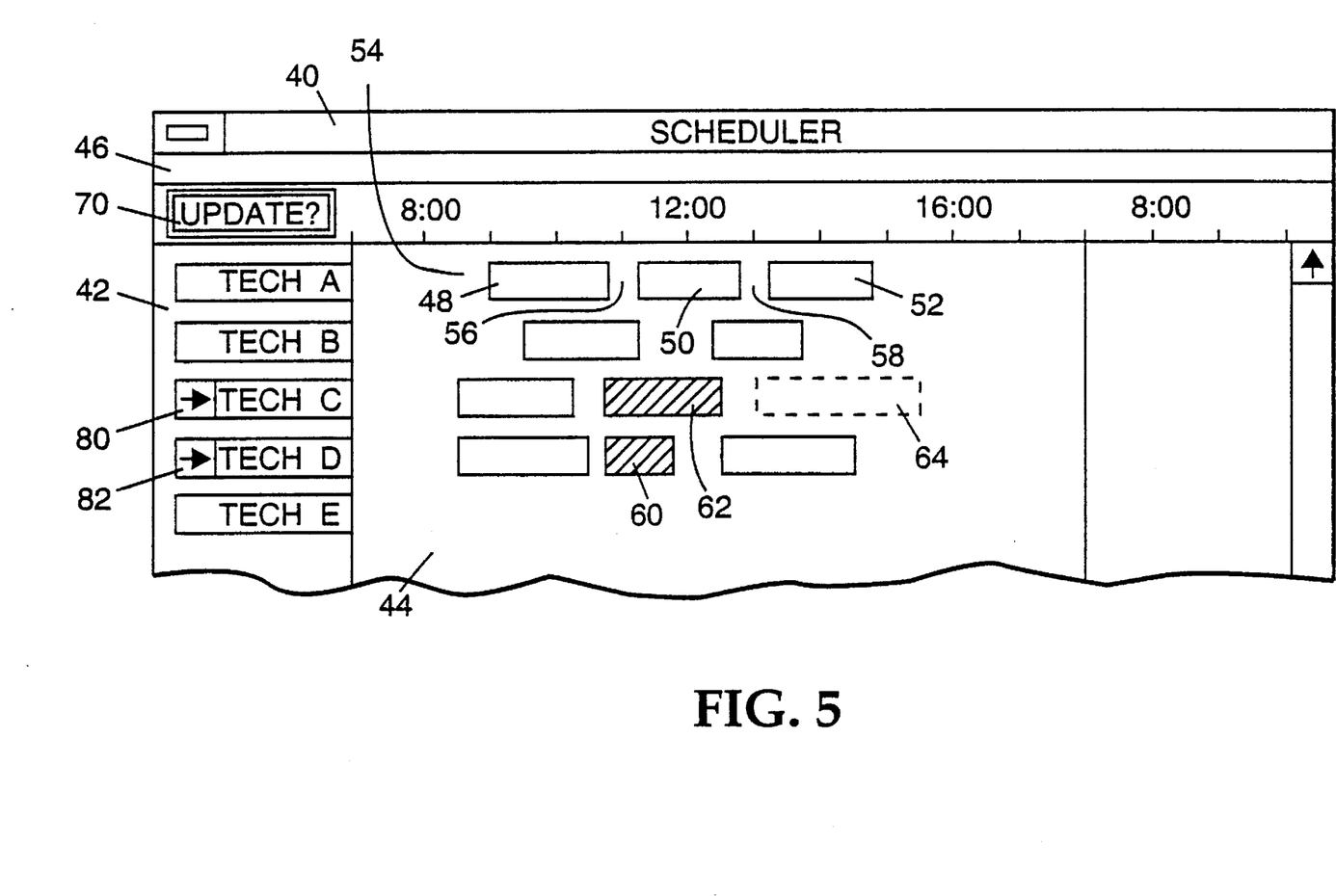
FIG. 5 is a second example of a user interface displaying a graphical representation of an assignment set in the update-on-request mode, in accordance with the present invention.

FIG. 5 is a second example of a graphical representation displayed by user interface 18 when the update-on-request mode is selected. As in the example of FIG. 4, the update message shown in FIG. 5 initially consists of only update button 70, indicating that an update is pending. When the system user clicks once on button 70 with the mouse, however, update module 20 controls user interface 18 to display a representation of the content of the pending update. Specifically, a single click on button 70 results in the display of shaded call blocks 60, 62 and dashed call block 64. The dashed call block 64 represents to the system user that a new call has been assigned to technician C, and that the next update will result in the addition of the call to the displayed schedule for technician C. The shaded call blocks 60, 62 further represent to the system user that the next update will result in movement of such calls due to reassignment. As shown in FIG. 5, the graphical representation may also include arrows 80, 82 displayed in technician field 42 to reinforce the indication that technicians C and D are the technicians to be affected by the pending update. As additional changes are received from A/S module 14, update module 20 may control user interface 18 to display additional dashed call blocks to be added in schedule field 44, and to shade any call blocks to be moved as a result of the changes, thereby providing the system user with an indication of the content of each particular change. When the system user clicks twice on button 70 with the mouse, update module 20 controls user interface 18 to add the contents of the update to the graphical representation. Thus, a single click on button 70 serves as a request for further information about the pending update, whereas a double click on button 70 serves as a request for an active update of user interface 18. As an alternative to the example described with reference to FIG. 5, the content of the pending update may be automatically displayed with button 70, without the need for user input requesting such information. In this case, a single click on button 70 would result in the incorporation of the update in the graphical representation displayed by user interface 18.

The assertive mode may result in disruption of the system user's work. In contrast, the update-on-request mode may allow the system user to work with obsolete information. Although either the assertive mode or the update-on-request mode may be appropriate for certain situations, a system user may desire an intermediate mode. The update-on-delay mode combines the characteristics of both the assertive mode and the update-on-request mode to achieve a trade-off between the extremes. When a change necessitates an update, update module 20 controls user interface 18 to display a non-modal update message notifying the system user of the pending update, as in the update-on-request mode. The update module 20 also activates a time delay function that counts down the elapse of time since the change was received. The update module 20 controls user interface 18 to display a representation of the remaining time in the time delay, and to frequently update the remaining time as time advances. When the time delay has elapsed, update module 20 immediately updates user interface 18 to include a representation of the change, as in the assertive mode. Until the time delay elapses, however, update module 20 may reset the time delay in response to a reset request received from the system user via input device 22, as indicated by line 36 of FIG. 1. The system user may enter a reset request by, for example, Clicking once on the representation of the remaining time with the mouse of input device 22. The system user may also click twice on the representation of the remaining time with the mouse to "freeze" the elapse of the time delay, stopping the time delay from running.

Figure 6:
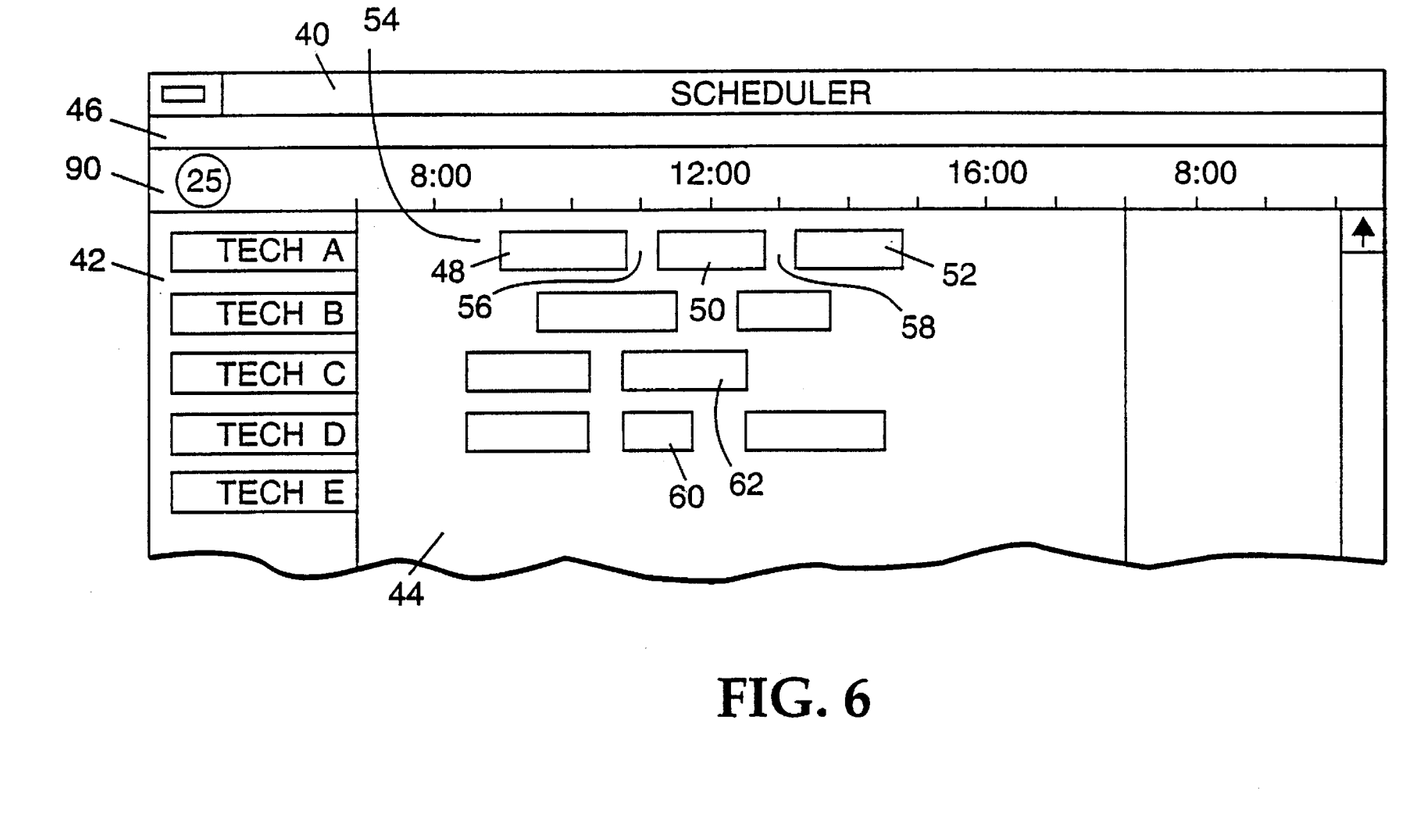
FIG. 6 is a first example of a user interface displaying a graphical representation of an assignment set in an update-on-delay mode, in accordance with the present invention.

FIG. 6 is a first example of a graphical representation displayed by user interface 18 when the update-on-delay mode of update module 20 is selected. The graphical representation shown in FIG. 6 substantially corresponds to that shown in FIG. 2. When a change to the assignment set is received, however, update module 20 controls user interface 18 to display a count-down timer 90. The count-down timer 90 indicates that a pending update will be made at the end of a time delay, and also represents the time remaining in the time delay. In the example of FIG. 6, count-down timer 90 is shown as a circle containing a representation of the remaining time in seconds. Of course, count-down timer may be realized by a variety of different representations providing the same functionality, including a "count-up" timer. When the system user clicks once on count-down timer 90 with the mouse, update module 20 resets the time delay. When the system user clicks twice on count-down timer 90, update module 20 freezes the time delay. The running time remains frozen until the system user again clicks on count-down timer 90. Thus, the system user can hold the pending update in abeyance indefinitely by single- or double-clicking on count-down timer 90. If the system user does not click on count-down timer 90, the time delay eventually elapses, resulting in an assertive update of user interface 18 by update module 20.

Figure 7:
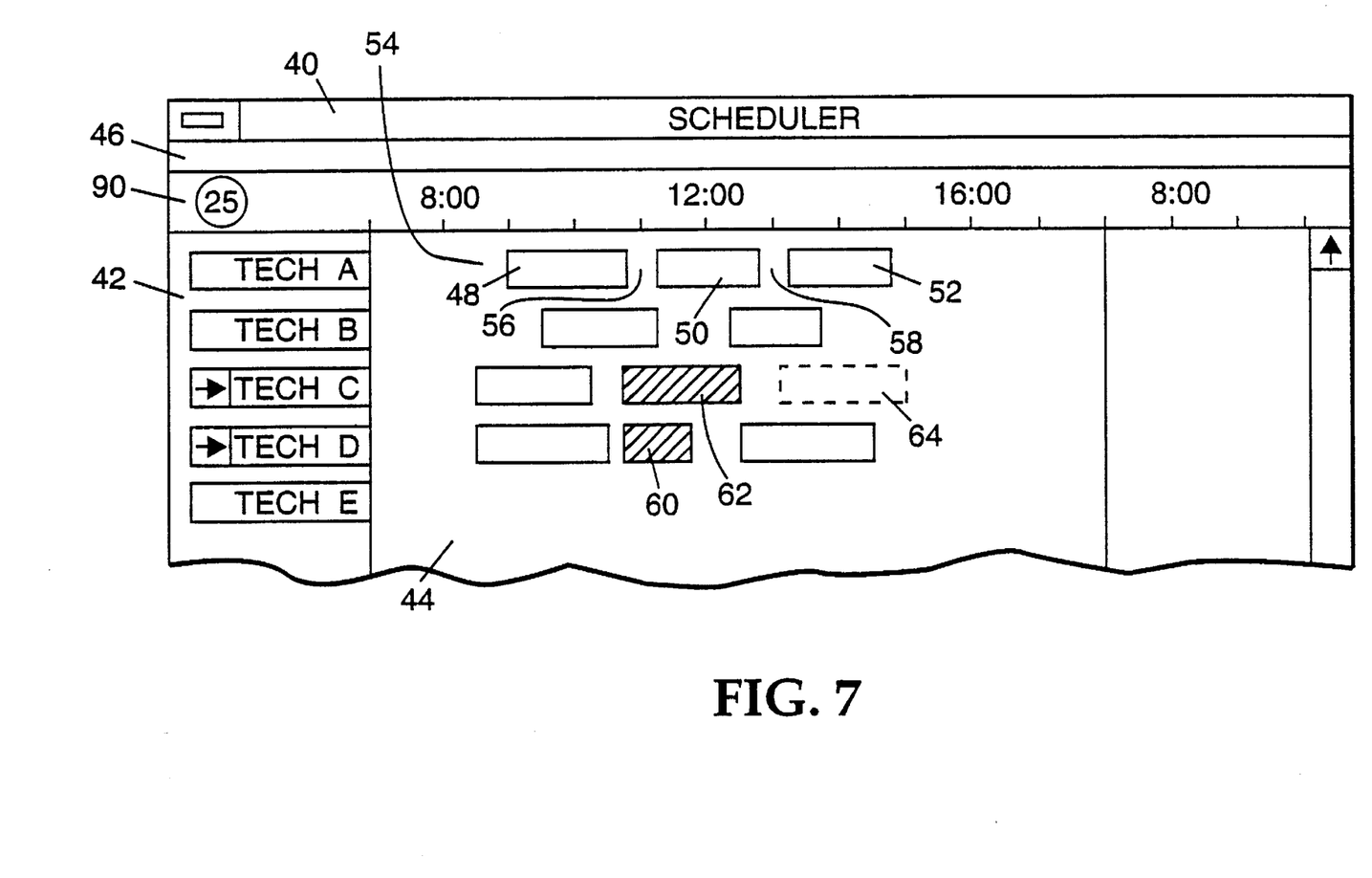
FIG. 7 is a second example of a user interface displaying a graphical representation of an assignment set in the update-on-delay mode, in accordance with the present invention.

FIG. 7 is a second example of a graphical representation displayed by user interface 18 when the update-on-delay mode of update module 20 is selected. The graphical representation shown in FIG. 7 substantially corresponds to that shown in FIG. 2. When a change to the assignment is received, however, update module 20 controls user interface 18 to display both a count-down timer 90, and an additional update message conveying detailed information about the content of the pending update. In the example of FIG. 7, the additional update message includes shaded blocks 60, 62, dashed block 64, and arrows 80, 82. As in the example of FIG. 6, the system user may single- and double-click on count-down timer 90 to reset and freeze, respectively, the time delay, thereby holding off incorporation of the pending update in the display.

The update messages displayed in either the update-on-request and update-on-delay modes serve to alert the system user to a situation that requires her input, and, in some cases, also provide valuable information concerning the content of the update. In this manner, the update message frees the human system user from the need to devote cognitive resources to remembering details. The update message thereby allows the system user to engage in high-level knowledge-based decisionmaking and communication with other human system users, realizing a more efficient allocation of tasks between computer-implemented system 10 and the human system user. The update-on-request and update-on-delay modes never force the system user to address a task that she did not initiate, enabling her to prioritize her actions. The assertive mode may be reserved for situations in which obsolete information must be avoided, or disruption of the system user's work is less likely.

Figure 8:
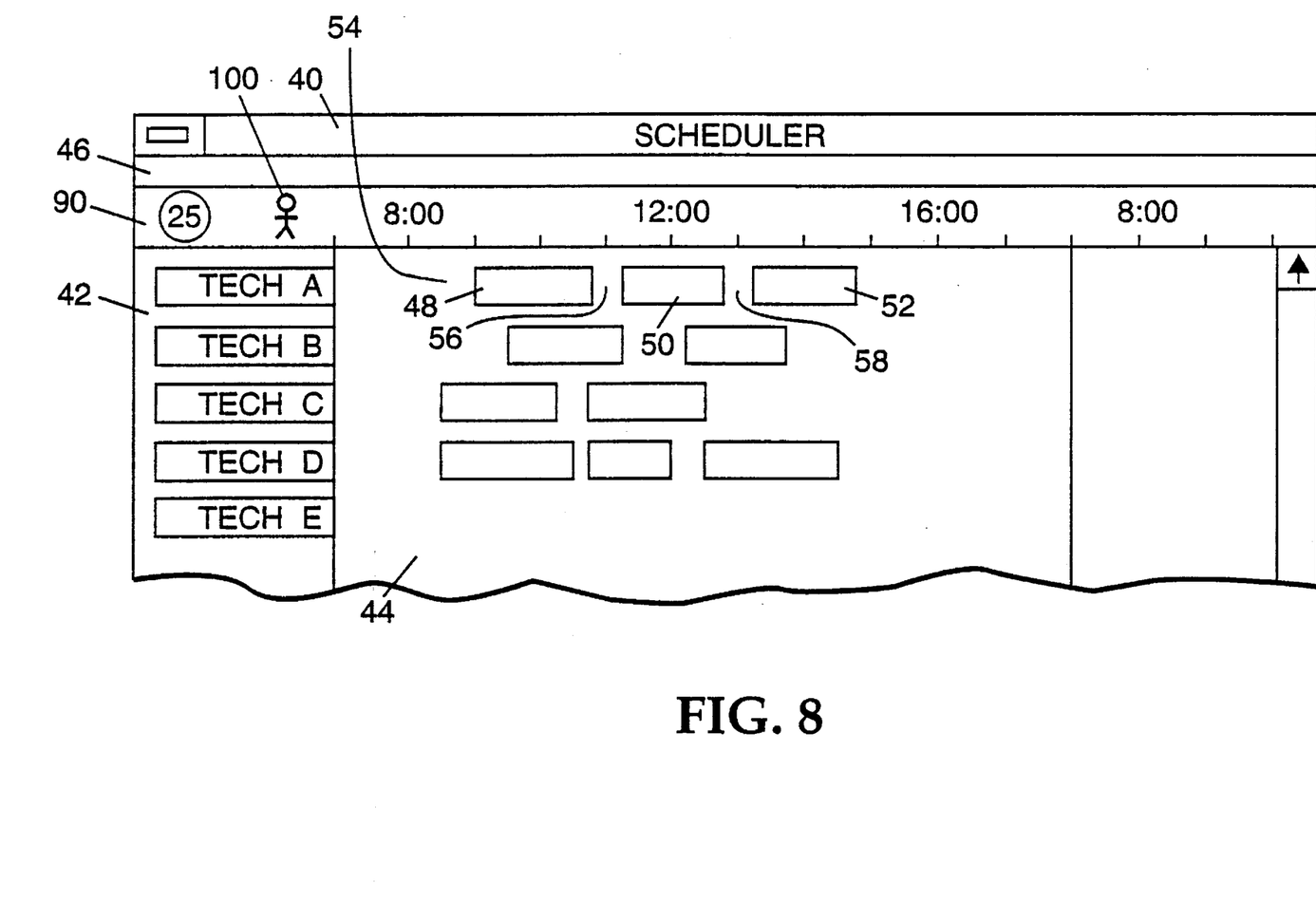
FIG. 8 is a first example of a user interface displaying a graphical representation of an assignment set in the update-on-delay mode, and incorporating a message indicating that a change was initiated by another system user, in accordance with the present invention.

In either the update-on-request mode or the update-on-delay mode, update module 20 may also control user interface 18 to display a system user message indicating that the event precipitating the update was received from a fellow system user via another user interface. The update module 20 may determine that a particular change was initiated by a system user based on information passed with the change from A/S module 14. FIG. 8 is a first example of a user interface incorporating a system user message when the update-on-delay mode is selected. The graphical representation shown in FIG. 8 substantially corresponds to that shown in FIG. 6. When a change initiated by an event from another user interface is received, however, update module 20 controls user interface to display an message such as stick figure 100 adjacent to count-down timer 90 in scheduler window 40. The stick FIG. 100 indicates to the system user that the pending update is the result of an event received from another human system user, and may be displayed with a number, letter, color, or other indicia to specify a particular system user. The present system user may have knowledge of circumstances associated with the other system user that may influence her decision to accept the update promptly. Alternatively, the present system user may wish to contact the other system user to discuss assignment and scheduling options. In either case, the displayed stick FIG. 100 provides information that may be helpful to the system user.

Figure 9:
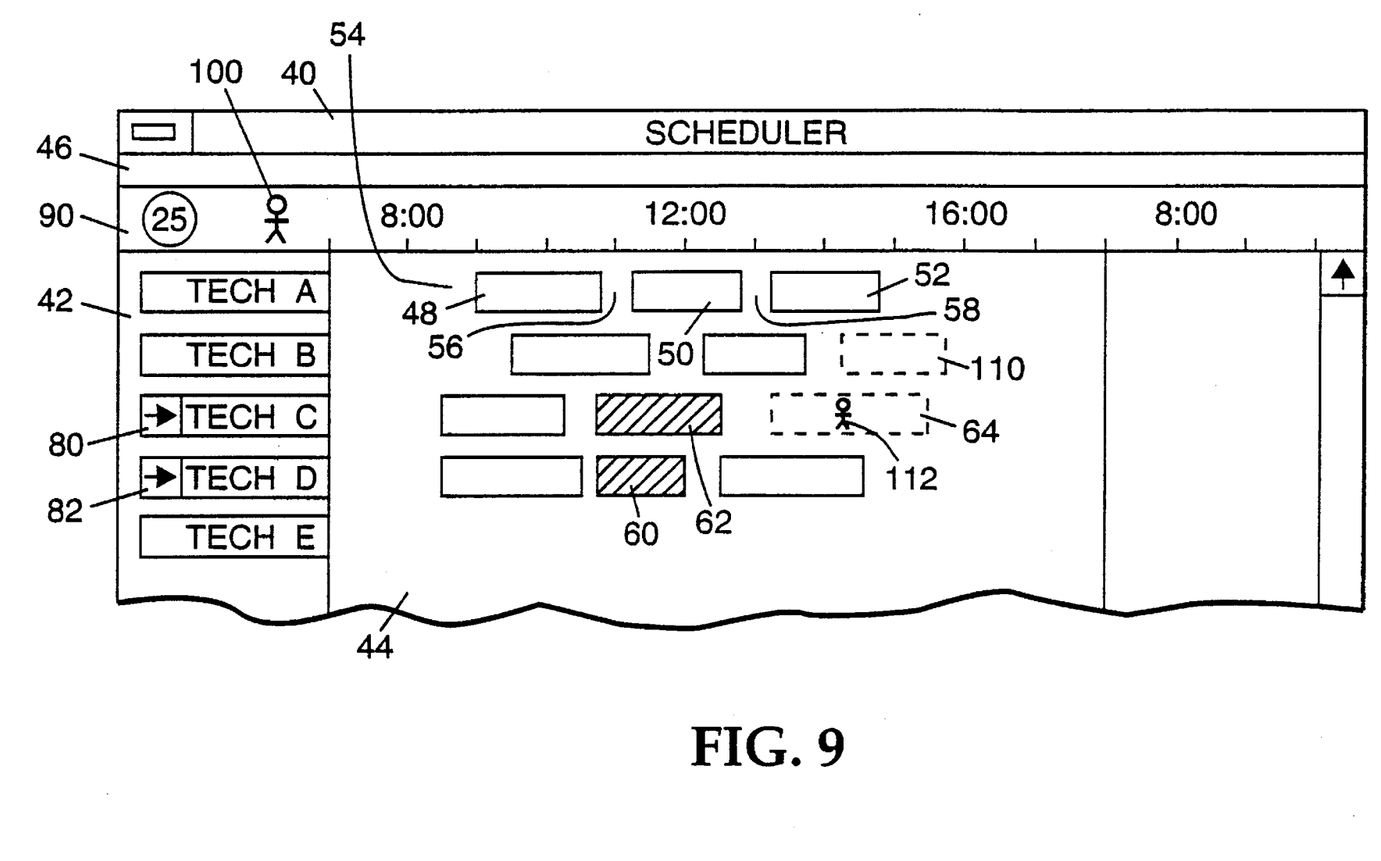
FIG. 9 is a second example of a user interface displaying a graphical representation of an assignment set in the update-on-delay mode, and incorporating a message indicating that a pending update was initiated by another system user, in accordance with the present invention.

An update may involve multiple changes initiated by both A/S module 14 or other system users, as represented by call block 64 and call block 110 of FIG. 9. In such a case, it may be desirable to distinguish changes initiated by events received from fellow system users and changes resulting from assignment and scheduling recommendations from A/S module 14. FIG. 9 illustrates a second example of a user interface incorporating a system user message when the update-on-delay mode is selected. The graphical representation shown in FIG. 9 substantially corresponds to that shown in FIG. 7, including a representation of the content of a pending update provided by shaded call blocks 60, 62, dashed call block 64, and arrows 80, 82. As shown in FIG. 9, however, update module 20 may further control user interface 18 to display both a message such as stick FIG. 100, and a message such as stick FIG. 112 within call block 64 to indicate that another system user directed the assignment of the particular call. Even if stick FIG. 112 is displayed within call block 64, it nevertheless may be advisable to include stick FIG. 100 somewhere within scheduler window 40 to indicate that at least one of the pending changes was directed by another system user in the event that the particular call block scrolls off of the visible portion of the display.

Figure 10:
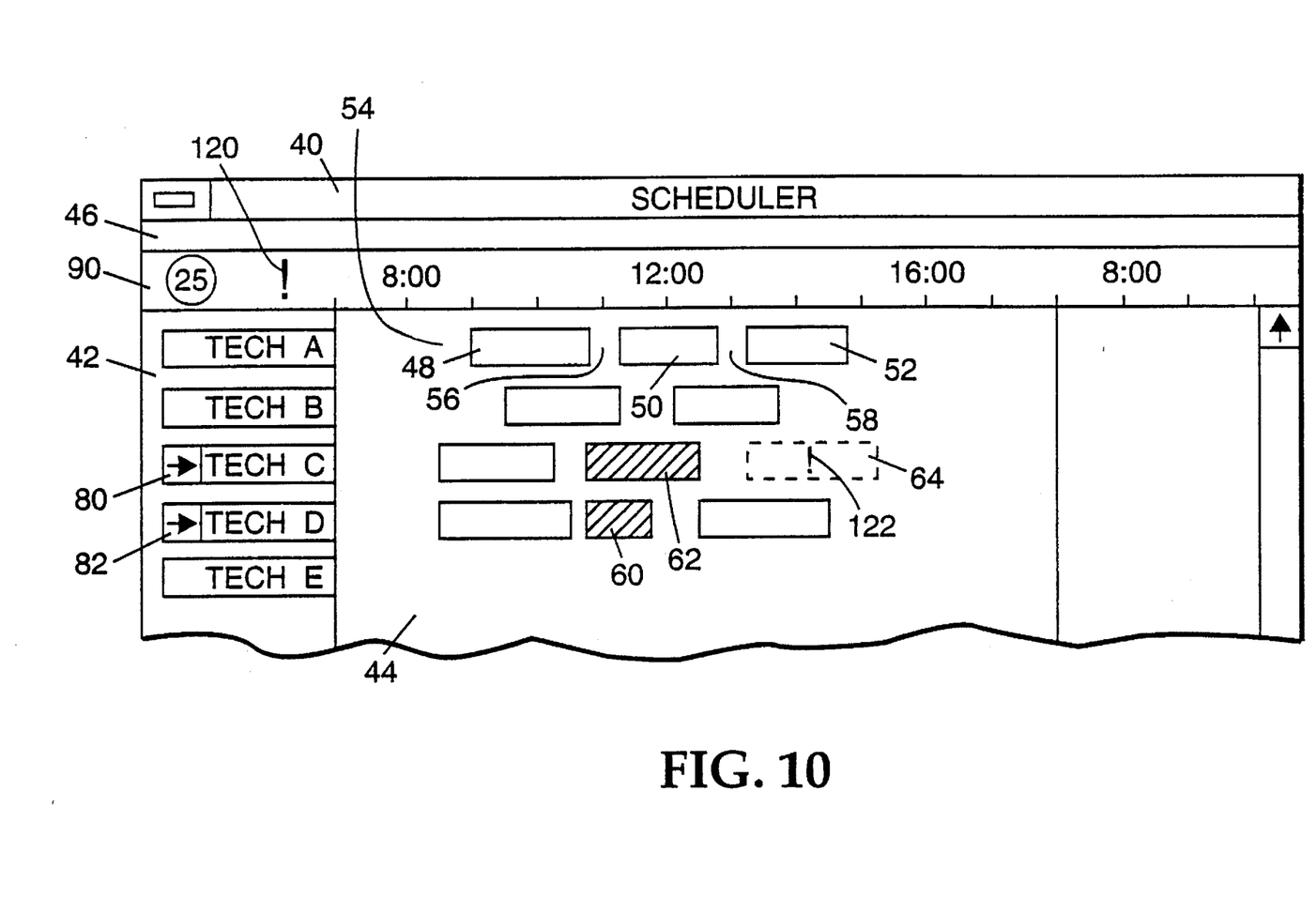
FIG. 10 is an example of a user interface displaying a graphical representation of an assignment set in the update-on-delay mode, and incorporating a message indicating that a pending update involves a high-priority resource request, in accordance with the present invention.

The update module 20 may further control user interface 18 to display a message indicating that one of the calls involved in a pending update is a high-priority call. The update module 20 may determine that a change involves a high-priority call based on information passed with the change from A/S module 14. FIG. 10 is an example of a user interface displaying a message indicating that a pending update involves a high-priority call in the update-on-delay mode. The graphical representation shown in FIG. 10 substantially corresponds to that shown in FIG. 7, including a representation of the content of a pending update provided by shaded call blocks 60, 62, dashed call block 64, and arrows 80, 82. As shown in FIG. 10, however, update module 20 may control user interface 18 to display a message such as exclamation mark 120 within scheduler window 40 to indicate that one of the calls involved in the pending update is a high-priority call. The update module 20 may further control user interface 18 to display an additional message such as exclamation mark 122 within call block 64, as shown in FIG. 10, to indicate that a particular call is a high-priority call.

The update module 20 may select one of the update modes based on selection input received by user interface 18 from the system user, as indicated by line 36 of FIG. 1. The ability to select one of the update modes of update module 20 enables the system user to define an update protocol appropriate for her needs. However, in accordance with the present invention, update module 20 may also enable the system user to develop hybrid modes by combining aspects of the assertive, update-on-request, and update-on-delay modes. The availability of hybrid modes allows the system user to compose interaction schemes appropriate for individual needs. Specifically, the system user may specify that update module 20 select one of the update modes based on additional criteria such as: (1) attributes associated with a particular call involved in the update, (2) attributes associated with a particular technician involved in the update, (3) when user interface 18 displays multiple scheduler windows, or "components," an identity of the component subject to the update, (4) visibility of a component of the display subject to the update, (5) the current event-processing load of the system, or (6) user behavior, each of which will be described below.

The system user may direct the update module 20 to select one of the update modes as a default mode, but to select a different update mode when a call or technician involved in a change received from A/S module 14 possesses certain attributes. Various call attributes may include (a) a type of service activity associated with the call, (b) a customer location associated with the call, (c) a priority value associated with the call, reflecting higher priorities for particular service activities, (d) and a customer associated with the call, possibly reflecting differing contract requirements among customers. Technician attributes may include, for example, a service territory associated with the technician. As an illustration, the system user may find, in practice, that the update-on-request mode or the update-on-delay mode is suitable under most circumstances. However, the system user may desire immediate intervention by the update module 20 in the assertive mode when a call received from a particular customer is involved in an update. The system user may desire immediate notification of a change in a call received from the customer for any number of reasons such as individual contract requirements of which the system user has special knowledge, or earlier commitments made to the customer.

The user interface 18 may be configured to display multiple scheduler windows, or components, on display device 24, enabling the system user to view one or more selected subsets of technician schedules. Each of the displayed components-would substantially correspond to any of the scheduler windows 40 shown in FIGS. 2–10. In this case, the system user may direct the update module 20 to select one of the update modes for a first component of user interface 18, and to select a different one of the update modes for a second component of user interface 18. For example, the system user may enter selection input directing update module 20 to select the more polite update-on-request or update-on-delay modes for a component with which the system user is primarily engaged. In contrast, the system user may direct update module 20 to select the assertive mode for secondary display components used less frequently by the system user. Assertive mode updates for such secondary display components are less likely to disrupt the system user's work, and therefore may be more acceptable.

The user interface 18 may also comprise a user interface buffer storing a representation of the information to be displayed on display device 24. However, user interface 18 may display only a portion of the information in the buffer at a given time. Thus, the display of user interface 18 includes a first, visible component displayed on display device 24, and a second, nonvisible component stored in the user interface buffer. It is conceivable that the second, nonvisible component may embody information representing a portion of the displayed scheduler window that is either obscured by another displayed window, or which does not appear within the coordinate boundaries of display device 24. Because the system user is unlikely to find updates that she cannot see on display device 24 objectionable, update module 20 may be configured to select one update mode for the first, visible component, and a different update mode for the second, nonvisible component. For example, the system user may direct the update module 20 to select the update-on-request mode or the update-on-delay mode for the first, visible component to avoid disruption of her work, and the assertive mode for the second visible component if changes that she cannot see are not a significant concern.

The update module 20 may also be configured to automatically change from one update mode to another update mode based on the current event-processing load, or "global state," of resource assignment system 10. The update module 20 may gauge the event-processing load of system 10 by the number of pending changes received from A/S module 14 that require user interface updates. The system user may want update module 20 to be more assertive when system 10 is excessively "backed-up" with updates. Thus, the system user may direct update module 20 to select the assertive update mode when a number of the pending changes exceeds a threshold. The selection of the assertive mode forces the system user to respond when the system load is heavy. In this manner, the system user can avoid using information that is not only obsolete, but exceedingly obsolete due to a large number of pending changes.

The update module 20 also may be configured to change from a previously selected one of the update modes to another one of the update modes in response to user behavior. Specifically, the system user may want update module 20 to operate in the relatively polite update-on-request or update-on-delay modes when she is sitting in front of the display device 24. However, a reversion to the assertive mode will likely be acceptable when the system user is not present or not actively engaged in using the interface. Thus, the system user may direct update module 20 to select either the update-on-request or update-on-delay mode for periods of frequent interaction, but to select the assertive mode in response to the elapse of a time delay from a time corresponding to the last input received from the system user via input device 22. The update module 20 may then restore the normally preferred update mode when the system user returns to display device 24 and the next input is received via input device 22.

Having described the exemplary embodiment of the present invention, additional advantages and modifications will readily occur to those skilled in the art from consideration of the specification and practice of the invention disclosed herein. In particular, it will be recognized that software and graphical representations suitable for realizing the present invention may be subject to many variants capable of conveying similar information with similar functionality. In addition, those skilled in the art will recognize the applicability of the system of the present invention for updating a user interface displaying textual representations of resource assignment information. Therefore, the specification and examples should be considered exemplary only, with the true scope and spirit of the invention being indicated by the following claims.

What is claimed is:

1. A computer-implemented system for assigning a plurality of resource requests among a plurality of resource providers, said system comprising:

an assignment database for storing an assignment set, said assignment set defining assignment of one or more of said resource requests among said resource providers;

a user interface for displaying a representation of at least part of said assignment set, and for receiving input from a system user; and an update module for receiving changes to said assignment set, and for updating said user interface to display a representation of each of said changes to said assignment set, said update module including means for selecting one of a plurality of update modes, said plurality of update modes including:

an assertive mode wherein said update module updates said user interface in response to receipt of each of said changes to assignment set, and an update-on-request mode wherein said update module updates said user interface in response to a combination of said receipt of each of said changes to said assignment set and an update request input received by said user interface from said system user.

2. The system of claim 1, wherein each of said resource requests is a field service call and each of said resource providers is a field service technician.

3. The system of claim 1, wherein said plurality of update modes of said update module further includes an update-on-delay mode wherein said update module updates said user interface in response to a combination of said receipt of each of said changes and an elapse of a time delay from a time of said receipt of each of said changes, said update module including means for resetting said time delay in response to a reset request input received by said user interface from said system user.

4. The system of claim 3, wherein each of said resource requests is a field service call and each of said resource providers is a field service technician.

5. The system of claim 1, wherein each of said changes to said assignment set defines an assignment of one of said resource requests to one of said resource providers, and said selecting means of said update module includes means for selecting one of said plurality of update modes based on one or more attributes associated with said one of said resource requests.

6. The system of claim 5, wherein each of said resource requests is a field service call and each of said resource providers is a field service technician.

7. The system of claim 5, wherein said one or more attributes associated with said one of said resource requests include at least one of a type of resource associated with said one of said resource requests, a priority value associated with said one of said resource requests, and a location associated with said one of said resource requests.

8. The system of claim 7, wherein each of said resource requests is a field service call, each of said resource providers is a field service technician, and said one or more attributes associated with said one of said resource requests further includes a customer associated with said one of said resource requests.

9. The system of claim 1, wherein each of said changes to said assignment set defines an assignment of one of said resource requests to one of said resource providers, and said selecting means of said update module includes means for selecting one of said plurality of update modes based on one or more attributes associated with said one of said resource providers.

10. The system of claim 9, wherein each of said resource requests is a field service call and each of said resource providers is a field service technician.

11. The system of claim 9, wherein said one or more attributes associated with said one of said resource providers include a territory associated with said one of said resource providers.

12. The system of claim 11, wherein each of said resource requests is a field service call and each of said resource providers is a field service technician.

13. The system of claim 1, wherein said selecting means of said update module selects one of said update modes based on a selection input received by said user interface from said system user.

14. The system of claim 13, wherein each of said resource requests is a field service call and each of said resource providers is a field service technician.

15. The system of claim 1, wherein said user interface includes means for displaying a first component including a representation of a first part of said assignment set, and means for displaying a second component including a representation of a second part of said assignment set, said selecting means of said update module including means for selecting one of said update modes for said first component of said user interface, and for selecting a different one of said update modes for said second component of said user interface.

16. The system of claim 15, wherein each of said resource requests is a field service call and each of said resource providers is a field service technician.

17. The system of claim 1, wherein said user interface includes means for displaying a first component including a representation of a first part of said assignment set, and a buffer means for storing an undisplayed second component including a representation of a second part of said assignment set, said selecting means of said update module including means for selecting one of said update modes for said first component, and for selecting a different one of said update modes for said second component.

18. The system of claim 17, wherein each of said resource requests is a field service call and each of said resource providers is a field service technician.

19. The system of claim 17, wherein said selecting means includes means for selecting said assertive mode for said second component.

20. The system of claim 19, wherein each of said resource requests is a field service call and each of said resource providers is a field service technician.

21. The system of claim 1, wherein said selecting means includes means for selecting one of said update modes based on a number of said changes received by said update module.

22. The system of claim 21, wherein each of said resource requests is a field service call and each of said resource providers is a field service technician.

23. The system of claim 21, wherein said selecting means includes means for selecting said assertive mode when said number of said changes received by said update module exceeds a threshold.

24. The system of claim 23, wherein each of said resource requests is a field service call and each of said resource providers is a field service technician.

25. The system of claim 1, wherein said selecting means includes means for changing from a selected one of said update modes to another one of said update modes in response to an elapse of a time delay from a time of a previous input received by said user interface from said system user.

26. The system of claim 25, wherein each of said resource requests is a field service call and each of said resource providers is a field service technician.

27. The system of claim 1, wherein said update module includes means for controlling said user interface, when said update-on-request mode is selected, to display a non-modal message notifying said system user of a pending update.

28. The system of claim 27, wherein each of said resource requests is a field service call and each of said resource providers is a field service technician.

29. A computer-implemented system for assigning a plurality of resource requests among a plurality of resource providers, said system comprising:
    an assignment database for storing an assignment set, said assignment set defining assignment of one or more of said resource requests among said resource providers;
    a user interface for displaying a representation of at least part of said assignment set, and for receiving input from a system user; and
    an update module for receiving changes to said assignment set, and for updating said user interface to display a representation of each of said changes to said assignment set, said update module including means for selecting one of a plurality of update modes, said plurality of update modes including:
        an assertive mode wherein said update module updates said user interface in response to receipt of each of said changes to said assignment set, and
        an update-on-delay mode wherein said update module updates said user interface in response to a combination of said receipt of each of said changes and an elapse of a time delay from a time of said receipt of each of said changes.

30. The system of claim 29, wherein each of said resource requests is a field service call and each of said resource providers is a field service technician.

31. A computer-implemented system for assigning a plurality of field service calls among a plurality of field service technicians, said system comprising:
    an assignment database for storing an assignment set, said assignment set defining assignment of one or more of said field service calls among said field service technicians;
    a user interface for displaying a representation of at least part of said assignment set, and for receiving input from a system user; and
    an update module for receiving said changes to said assignment set, and for updating said user interface to display a representation of each of said changes to said assignment set, said update module including means for selecting one of a plurality of update modes, said plurality of update modes including:
        an assertive mode wherein said update module updates said user interface in response to receipt of each of said changes to said assignment set,
        an update-on-request mode wherein said update module updates said user interface in response to a combination of said receipt of each of said changes to said assignment set and an update request input received by said user interface from said system user, and
        an update-on-delay mode wherein said update module updates said user interface in response to a combination of said receipt of each of said changes and an elapse of a time delay from a time of said receipt of each of said changes.

* * * * *